United States Patent
Anderson (10) Patent No.: US 10,431,049 B2
(45) Date of Patent: Oct. 1, 2019

(54) LOTTERY GAME SYSTEM AND METHOD WITH AUGMENTED REALITY COMPONENT

(71) Applicant: Scientific Games International, Inc., Newark, DE (US)

(72) Inventor: Peter Rys Anderson, Northbrook, IL (US)

(73) Assignee: Scientific Garnes International, Inc., Newark, DE (US)

( * ) Notice: Subject to any disclaimer, the term of this patent is extended or adjusted under 35 U.S.C. 154(b) by 145 days.

(21) Appl. No.: 15/711,282

(22) Filed: Sep. 21, 2017

(65) Prior Publication Data

US 2018/0089927 A1   Mar. 29, 2018

Related U.S. Application Data

(60) Provisional application No. 62/400,824, filed on Sep. 28, 2016.

(51) Int. Cl.
G07F 17/32 (2006.01)
G06T 19/00 (2011.01)
G06F 3/0481 (2013.01)

(52) U.S. Cl.
CPC .......... *G07F 17/329* (2013.01); *G06F 3/0481* (2013.01); *G06F 3/04815* (2013.01); *G06T 19/006* (2013.01); *G07F 17/3211* (2013.01); *G07F 17/3218* (2013.01); *G07F 17/3237* (2013.01); *G07F 17/3258* (2013.01)

(58) Field of Classification Search
CPC . G07F 17/329; G06T 19/006; G06T 2215/16; G06T 2200/04; G06T 2200/24; G06F 3/04815; G02B 27/2214; G02B 27/2285; G03B 21/562
See application file for complete search history.

(56) References Cited

U.S. PATENT DOCUMENTS

| | | | |
|---|---|---|---|
| 8,226,011 B2 | 7/2012 | Merkli et al. |
| 8,517,811 B2 | 8/2013 | Pollard et al. |
| 9,269,219 B2 | 2/2016 | Lyons et al. |
| 9,626,807 B2 | 4/2017 | Lyons et al. |
| 2008/0194323 A1 | 8/2008 | Merkli et al. |
| 2011/0065496 A1 | 3/2011 | Gagner et al. |

(Continued)

*Primary Examiner* — David Duffy
*Assistant Examiner* — Ankit B Doshi
(74) *Attorney, Agent, or Firm* — Dority & Manning, P.A.

(57) ABSTRACT

A method for implementing an augmented reality lottery game on a player's mobile device includes providing lottery tickets with a code for entry into the augmented reality game. A common game server communicates with the mobile devices, and a player enters and transmits the code via the mobile device to initiate the augmented reality game. The game server receives real-world location data from the mobile device and transmits participating establishment locations to the mobile device within a predefined distance of the player's location. Upon verifying the player's location, the game server enables an overlay of virtual objects on a screen image on the player's mobile device of the establishment location. The mobile device provides instructions to the player for interacting with the virtual object in accordance with the augmented reality game.

13 Claims, 4 Drawing Sheets

(56) References Cited

U.S. PATENT DOCUMENTS

2015/0228148 A1* 8/2015 Barnes ................... G07F 17/32
   463/17
2016/0148464 A1* 5/2016 Lahmi ................ G07F 17/3241
   463/17

* cited by examiner

LOTTERY GAME SYSTEM AND METHOD WITH AUGMENTED REALITY COMPONENT

RELATED APPLICATION

The present Application claims the benefit of U.S. Provisional Application No. 62/400,824, filed Sep. 28, 2016.

BACKGROUND

Scratch-off lottery tickets (also referred to as "instant" lottery tickets) are well-known in the industry and have become a staple lottery product the world over. However, the lottery industry must continuously innovate and update the types of games provided to players, including the delivery mechanism, in order to sustain and grow the player base.

With increased availability and connectivity to the Internet, players are looking to play lottery games via network-enabled personal mobile devices, such as a smartphone or PDA (personal data assistant). In this regard, various lottery providers or authorities are now providing electronic game tickets wherein the reveal aspect is conducted via the player's smartphone. For example, the New York Lottery has recently introduced a scratch-off lottery ticket game ("Gold Castle") wherein the ticket includes a conventional scratch-off game play area and an optional 3-D game reveal capability. Players can download an application to their smartphone that enables a program to scan a code on the ticket and automatically launch the application, which presents a 3-D view of a castle on the player's smartphone. The player taps windows in the castle, which open to reveal whether the player has won a prize or not.

Virtual or augmented reality location-based video games that are played by applications running on smartphones have also grown in popularity, such as the Pokémon Go™ and Ingress™ games from Niantic. These games have introduced new and exciting experiences to players but, to date, have not been successfully introduced into a lottery gaming environment.

SUMMARY

Objects and advantages of the invention will be set forth in part in the following description, or may be obvious from the description, or may be learned through practice of the invention.

The present invention relates to various method embodiments for play of an augmented reality lottery game The present invention also relates to a computer-implemented system for implementing an augmented reality lottery game.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Generally, the present disclosure is directed to a computer-based system and method for play of a primary lottery game or a second-chance game associated with an individual lottery ticket on a mobile device, such as a smartphone. The game is a player location-based game that places the player in an augmented reality ("AR") world wherein virtual elements are introduced into the player's real world location. The player must interact with these virtual elements in order to reveal the game outcome (e.g. for a primary game component of the lottery ticket) or win or accumulate points or prizes in a secondary game (e.g., for a second-chance drawing). The type or presentation of the virtual elements may vary widely and are not a limiting aspect of the invention. For example, in one embodiment, the game may have an overall Monopoly™ game theme, wherein the virtual elements are Monopoly game pieces or cards introduced into the player's real word environment, as explained in greater detail below.

In addition, the manner in which the player interacts with the virtual elements may vary widely. For example, the player may be required to capture or collect the virtual elements by taking an action on their mobile device, such as a swipe or tap on the display screen. Depending on how the game is played, the outcome of the player's interactions may be predetermined, wherein the player's actions do not affect the outcome of the action depicted on the screen. Alternately, the actions may be skill-based, wherein the outcome is based on the player's ability direct the outcome on the screen.

In a certain embodiment, a game server hosts the location-based AR game wherein virtual elements are introduced into the player's real world geography. Players can navigate to geographic coordinates in the real world where the virtual elements are introduced. In particular, the positions of players can be monitored or tracked using, for instance, a positioning system (e.g. a GPS system) associated with a player's mobile device. Player position information can be provided to a game server and used to update player locations in the real world.

The virtual elements can be linked with real world landmarks/locations. For instance, the game can include various virtual elements associated with landmarks, retail establishments, or other areas of interest in the real world. For instance, as players navigate geographic coordinates in the real world, the players can discover and interact with virtual elements introduced into their real world environment at specific geographic locations, wherein such interaction reveals an outcome in a lottery game, or otherwise allows the player to accumulate points or other value in a secondary game.

The location-based augmented reality game can be linked to real world commercial activity to encourage or incentivize commercial activity in the real world related to lottery activity. For example, participating retail establishments can become sponsors in the game, wherein their respective establishment become a geographic location in the game where the virtual elements are introduced. These retail establishments may also be locations where the initial lottery tickets are sold. The game thus encourages players to return to the same or different participating retail establishments during the course of the game. This increased foot traffic in the retail establishments is highly desirable by the retail vendors. In addition, other commercial sponsors, advertisers, businesses, and other entities can become authorized sites in the reality game where virtual elements are made available for a fee to the lottery authority.

For instance, entities can attract customers to their real world locations by requesting that virtual elements or other game features be located at a location of commercial activity associated with the entity in the real world. These virtual elements or game features can be designed to be beneficial or necessary to visit to achieve certain game objectives or achievements within the game. As a result, sponsors and other entities can attract customers to their real world locations by requesting and arranging for certain virtual elements to be located at particular locations within the parallel reality game.

As another example, a business or other entity that desires to increase its visibility to customers can arrange for game features to be linked to the real world purchase of merchandise or services. For instance, the purchase of a particular item or service in the real world can be linked with enhanced powers, hidden game features or game objectives, or other items/events that are valuable in the augmented reality game. This gives players an incentive to visit the business or other entity, to purchase the item or service, and to talk about their experience with friends and other players of the AR reality game.

As yet another example, the AR game can include a rewards module that is configured to distribute coupons, vouchers, or other rewards useful in the real world to players of the AR game that reach certain achievements or complete certain game objectives. For instance, a business or other entity can arrange for a coupon, discount, voucher, or other reward associated with the business to be distributed to players upon the completion of certain game tasks or game objectives.

In still other embodiments, a sponsor or other entity can arrange for the tagging or branding of certain virtual elements in the AR game. These branded elements can increase the visibility of the sponsor or other entity to players of the game. If the branded elements are valuable or powerful within the location based game, word about the branded elements can spread virally among players of the game, providing increased visibility to the sponsor or other entity.

According to another exemplary embodiment, the AR game can include game features that are linked with data collection activities in the real world. The data collected by the player as a result of performing the data collection activity can be in the form of a photograph, a sound recording, textual information, or other suitable data (e.g. the location of Wi-Fi hotspots, Bluetooth connections, etc.). The collected information can be sent to the game server which can analyze and use the data to improve data associated with the real world aspects of the AR game. For example, a game feature directly linked with data collection activity can include a game objective or task that involves acquiring information about real world locations where the games are played and providing this information as a condition for completion of the game objective. For example, a game objective associated with a virtual element can require a player to take a photograph of a particular landmark, art object, store front, or other feature located in the real world at a location corresponding to the location of a virtual element. In return for completing the game objective, the player can receive a suitable reward, such as a reward or points in a player account that are redeemable for prizes.

An exemplary game feature indirectly linked with data collection activity can include placing virtual elements at particular locations in the real world so that actions players take to interact with the virtual elements indirectly reveal information about the real world. For instance, a virtual game element can be located at a location corresponding to a park, hiking area, or other locale. By tracking player movements to navigate to the virtual element, the game system can also track corresponding movements in the real world that provide an indication of the location of traversable paths to the area.

Figure 1:
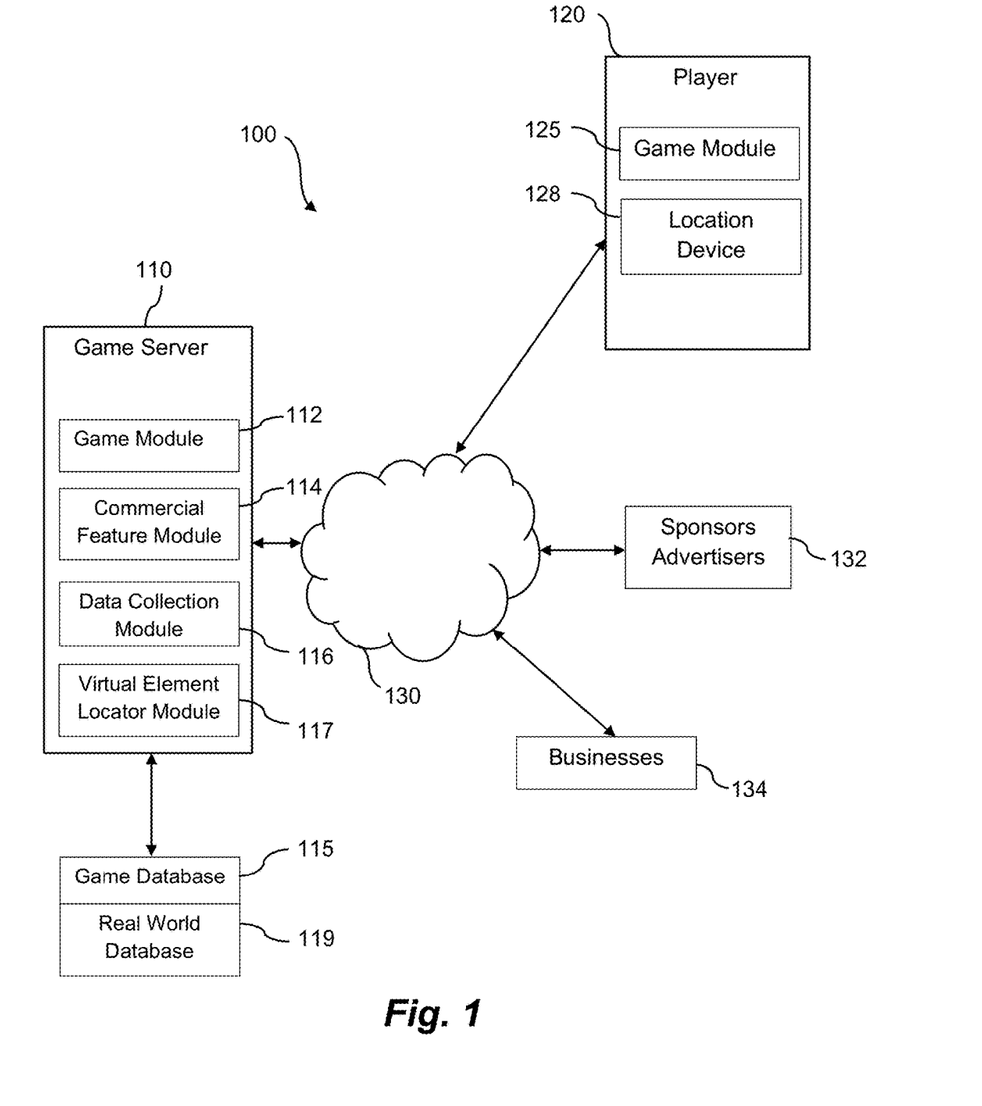
FIG. 1 depicts an exemplary computer-based system for implementing a location-based augmented reality lottery game according to an exemplary embodiment of the present disclosure.

FIG. 1 illustrates an exemplary computer-implemented location-based gaming system 100 configured in accordance with an embodiment of the present disclosure. The location-based gaming system 100 provides for the interaction of one or a plurality of lottery game players in a real world environment augmented with virtual game elements. In particular, a geographic area in the real world becomes a designated game play area wherein a player can move to various geographic locations in the real world. The system 100 can track a player's position in the real world and direct gaming functions accordingly.

Figure 2:
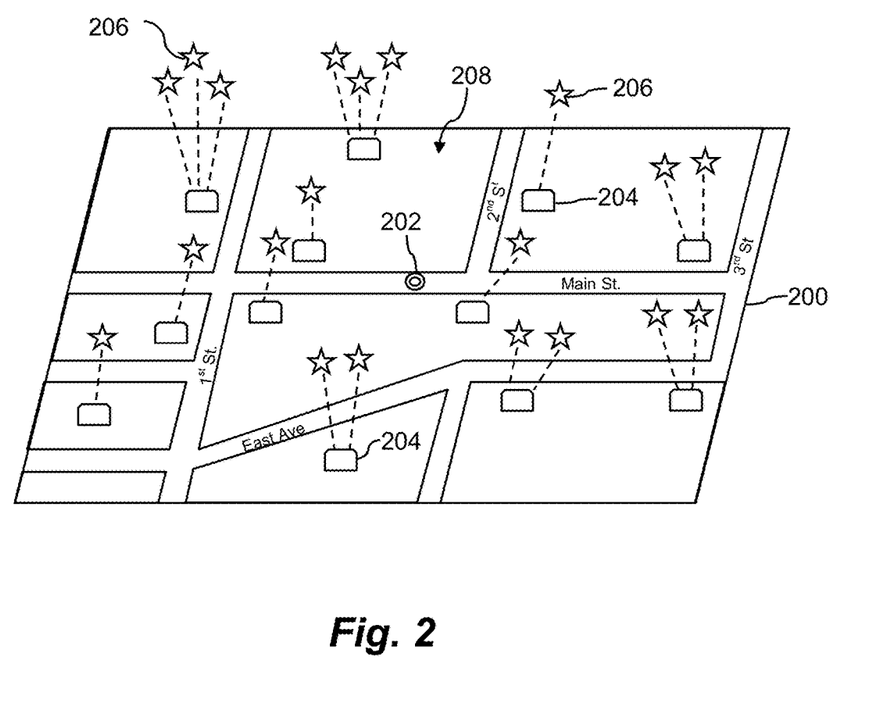
FIG. 2 depicts a real word geography populated with virtual elements as select locations.

FIG. 2 depicts a conceptual diagram of a real world 200 defined by a geographic area 208 associated with a town, neighborhood, city, campus, locale, a country, continent, the entire globe, or other geographic area. A player's position 202 in the geographic area is noted. As the player 202 moves about in the geographic area 208, the coordinates of the geographic area may change accordingly. For example, the geographic area 208 can be defined as a two square mile area around the player's location 202. A positioning system associated with the player's mobile device (e.g. a GPS system) can be used to track a player's position as the player navigates the range of geographic coordinates in the real world.

The location-based lottery game can include a game objective that requires players to travel to designated locations 204 within the geographic area 208 to interact with various virtual elements 206 that are introduced into the game at the locations 204. The type of locations 204 can vary widely within the scope and spirit of the invention. For example, the locations 204 may be well-known landmarks or buildings, parks, or generally any publically accessible location. As discussed above, the locations 204 may be commercial establishments that have a commercial activity linked to the lottery game. For example, the locations 204 may be authorized retail establishments for the sale of lottery tickets, or may be sponsors of a secondary or second-chance lottery game (or prize awards in such games).

The manner in which the player interacts with the virtual elements 206 can vary depending on the overall gam theme. In certain embodiments, a game objective can require players to "capture" or otherwise acquire virtual elements 206 such as taking a photograph and/or verifying, obtaining, or capturing other information about the location 204 associated with the virtual element 230. The player may need to take an action on their mobile device in order to acquire the virtual element 206, such as a screen swipe action or button activation to control a virtual weapon or tool used to acquire the virtual element 206.

Referring back FIG. 1, the system 100 can include a lottery provider server architecture, where a game server 110 communicates with one or more players (mobile devices) 120 over a network 130. Although one player 120 is illustrated, it should be understood that any number of players 120 can be connected to the game server 110 over the network 130. The server 110 can host a universal gaming module 112 that controls aspects of the location-based game for all players 120 and receives and processes each player's input in the location based game. On the player-side, each mobile device 120 can include a gaming module 125 that operates as a gaming application so as to provide the player with an interface to the system 100. The game server 110 transmits game data over the network 130 to the mobile device 120 for use by the gaming module 125 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include one or more processors and one or more computer-readable media. The computer-readable media can store instructions which cause the processor to perform operations.

The game server 110 can include or can be in communication with a game database 115. The game database 115 stores game data used in the location-based game to be provided to the players 120 over the network 130. The game data can include: data associated with players of the location-based game (e.g. player information, player experience level, player currency, current player positions in the virtual world/real world, player energy level, player preferences, team information, faction information, etc.); data associated with game objectives (e.g. data associated with current game objectives, status of game objectives, past game objectives, future game objectives, desired game objectives, etc.); data associated virtual elements in the real world (e.g. positions of virtual elements, types of virtual elements, game objectives associated with virtual elements; corresponding actual world position information for virtual elements; behavior of virtual elements, relevance of virtual elements etc.); data associated with real world objects, landmarks, positions linked to virtual world elements (e.g. location of real world objects/landmarks, description of real world objects/landmarks, relevance of virtual elements linked to real world objects, etc.); data associated with player actions/input (e.g. current player positions, past player positions, player moves, player input, player queries, player communications, etc.); and any other data used, related to, or obtained during implementation of the location-based AR lottery game. The game data stored in the game database 115 can be populated either offline or in real time by system administrators and/or by data received from users/players of the system 100, such as from one or more player mobile devices 120 over the network 130.

The game server 110 can be configured to receive requests for game data from the player mobile devices and to respond to those requests via the network 130. For instance, the game server 110 can encode game data in one or more data files and provide the data files to the device 120. In addition, the game server 110 can be configured to receive game data (e.g. player positions, player actions, player input, etc.) from the devices 120 via the network 130. For instance, the devices 120 can be configured to periodically send player input and other updates to the game server 110, which the game server 110 uses to update game data in the game database 115 to reflect any and all changed conditions for the game.

As depicted, the game server 110 can include a universal game module 112. The universal game module 112 hosts the location-based game for all players and acts as the authoritative source for the current status of the location-based game for all players. The universal game module 112 receives game data from player devices 120 (e.g. player input, player position, player actions, landmark information, etc.) and incorporates the game data received into the overall location-based game for all players of the location-based game. The universal game module 112 can also manage the delivery of game data to the player devices over the network 130.

The game server 110 can further include a commercial feature module 114 that can be separate from or a part of the universal game module 112. The commercial game feature module 114 can manage the inclusion of various game features that are linked with a commercial activity in the real world. For instance, the commercial game feature module 114 can receive requests from sponsors/advertisers 132, businesses 134, or other entities over network 130 (via a network interface) to include game features linked with commercial activity in the real world game. The commercial game feature module 114 can then arrange for the inclusion of these game features in the parallel reality game. Examples of such commercial features include the purchase of merchandise from a sponsor or in a retail location at a discount, or to receive bonus points in a secondary game, or any activity that incentivizes players to purchase goods from a particular sponsor to visit a particular location.

The game server 110 can further include a data collection module 116 that can be separate from or a part of the universal game module 112. The data collection module 116 can manage the inclusion of various game features within the real world game that are linked with a data collection activity in the real world. For instance, the data collection module 116 can modify game data stored in the game database 115 to include game features linked with data collection activity in the real world game. The data collection module 116 can also analyze data collected by players pursuant to the data collection activity and provide the data for access by various platforms.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

The player's mobile device 120 can be any portable computing device that can be used by a player to interface with the gaming system 100. For instance, the device 120 can be a wireless device, a personal digital assistant (PDA), portable gaming device, cellular phone, smart phone, tablet, navigation system, handheld GPS system, wearable computing device, a display having one or more processors, or other such device. In short, the player mobile device 120 can be any computer-device or system that can execute a gaming module 125 to allow a player to interact with the game system 100.

The player mobile device 120 can include one or more processors and one or more computer-readable media. The computer-readable media can store instructions which cause the processor to perform operations. The device 120 can include various input/output devices for providing and receiving information from a player, such as a display screen, touch screen, touch pad, data entry keys, speakers, and/or a microphone suitable for voice recognition. The device 120 can further include a network interface for providing communications over the network 130. A network interface can include any suitable components for interfacing with one more networks, including for example, transmitters, receivers, ports, controllers, antennas, or other suitable components.

The gaming module 125 executed by the player mobile device 120 provides an interface between a player and the location-based game. The gaming module 125 can present a user interface on a display device associated with the mobile device 120 that displays a real world environment associated with the game and a virtual element(s) overlay. The interface allows the player to interact with the overlaid virtual elements to perform various game objectives. The gaming module 125 can access game data received from the game server 110 to provide an accurate representation of the game to the user. The gaming module 125 can receive and process player input and provide updates to the game server 110 over the network 130.

As mentioned, the gaming system 100 is for a location-based game, and the player mobile device 120 is preferably a portable computing device, such as a smartphone or other portable device, that can be easily carried or otherwise transported with a player. A player can interact with the virtual elements simply by carrying or transporting the mobile device 120 to locations in the real world where the virtual elements are enabled. In this regard, the player mobile device 120 can include a location device 128 that monitors the position of a player during game play. The location device 128 can be any device or circuitry for monitoring the position of the mobile device 120. For example, the location device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position.

As the player moves around with the mobile device 120 in the real world, the location device 128 tracks the position of the player and provides the player position information to the gaming module 125, which continuously or periodically updates the player's actual position in the real world. Based on this real world position, the gaming module 112 identifies real world locations within a defined proximity where the virtual elements are located and transmits such locations to the game module 125, which displays or otherwise notifies the player of such locations, for example by displaying the locations on a real world map provided on the mobile device's screen. In certain embodiments, location information associated with a player is utilized only if permission is granted after the player has been notified that location information of the player is to be accessed and how the location information is to be utilized in the context of the game. In addition, any location information associated with players will be stored and maintained in a manner to protect player privacy.

The network 130 can be any type of communications network, such as a local area network (e.g. intranet), wide area network (e.g. Internet), or some combination thereof. The network can also include a direct connection between a player mobile device 120 and the game server 110. In general, communication between the game server 110 and player mobile device 120 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Referring again to FIGS. 1 and 2, for locating the virtual elements 206 in the real world geography 208, the game server 110 accesses data associated with one or more real world conditions. For instance, a virtual element locator module 117 implemented by the game server 110 can access data associated with one or more real world conditions stored in the game database 115 (which may include a real world condition database 119). Alternatively, the locator module 114 can access one or more different data sources providing real world condition data, such as a third party data service or other data source. Exemplary data associated with one or more real world conditions accessed by the game server 110 can include the aggregate locations of individuals (e.g. players) in the real world; local time data; local data providing locations of cultural value, recreational value, historical value, commercial value, or other value; map data providing the locations of roads, highways, and waterways, public property, private property, and other information; current and past locations of individual players; hazard data; weather data; event calendar data; and other suitable data.

The game server 110 analyzes the data associated with the one or more real world conditions to determine a location for placement of a virtual element 206 at a location 204 based on the data associated with the one or more real world conditions. The locator module 114 can determine locations for placement of any type of virtual element 206 used in the AR game, such as a virtual object, virtual item, virtual energy, or other virtual element 206 that forms a part of the AR game. Exemplary analysis techniques for analyzing data associated with real world conditions to determine a location for placement of virtual elements in the virtual world will be discussed in detail below.

The game server 110 can modify game data stored in, for instance, the game database 115 and/or transmitted to player mobile devices 120 over the network 130 to locate one or more virtual elements 206 at locations determined based on the data associated with real world conditions. The game server 110 can send files encoded with game data to the mobile devices 120 over the network 130, wherein the game data can include data locating virtual elements 206 in the player's real world.

The player mobile device 120 accesses the game data transmitted by the game server 110 and then presents the virtual elements 206, for example by displaying a real world picture of the player's location 204 acquired by the device's camera on a display screen with one or more of the virtual elements 206 overlaid on the real world picture. Other suitable interfaces can be provided to present the virtual elements 206 to the player, such as audio, vibratory, or other interfaces so that a player can interact with the virtual elements 206 without having to look at a display screen of the device 120.

The player mobile device 120 receives data indicative of player actions in the AR game, such as data indicative of the player's movement as determined by the location device 128, and provides this data to the game server 110. The game server receives the data and updates the game data for the AR game based on the received data. For example, the received data may indicate that the player has moved a predefined distance away from the location 204, wherein the virtual elements 206 are disabled or removed from the screen until the player returns or moves on to another location 204.

In certain embodiments, the virtual elements can be located at locations 204 corresponding to the predicted player path so that the game encourages further interaction of the player in the AR game. For example, data associated with current and past player position for a particular player of the AR game is accessed by the locator module 114 from the game database 115 which stores position information associated with players of the AR game. The locator module 114 can access map data providing the locations of traversable paths proximate the player's current position, and can analyze current player position and direction, past player position and direction, the locations of traversable paths proximate the players and predict a future path for the player. The locator module 114 can then locate a virtual element 206 along the predicted player path.

Figure 3:
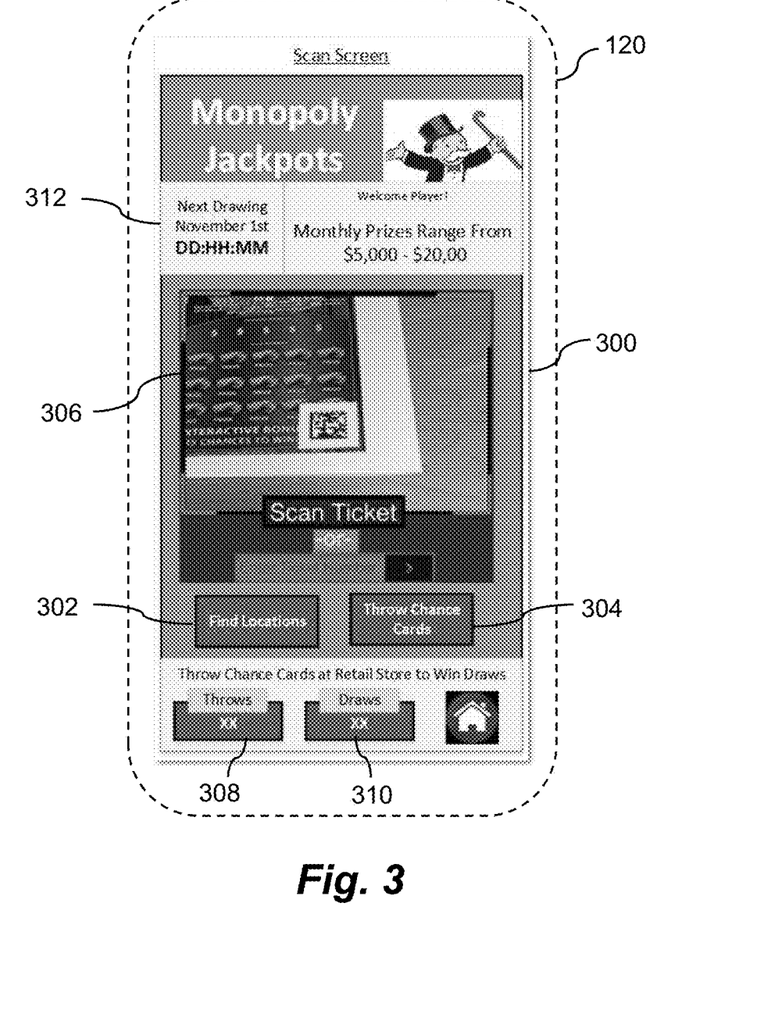
FIG. 3 depicts an exemplary screen of player's mobile device for initiating a game play of an augmented reality lottery game according to an exemplary embodiment of the present disclosure.
Figure 4:
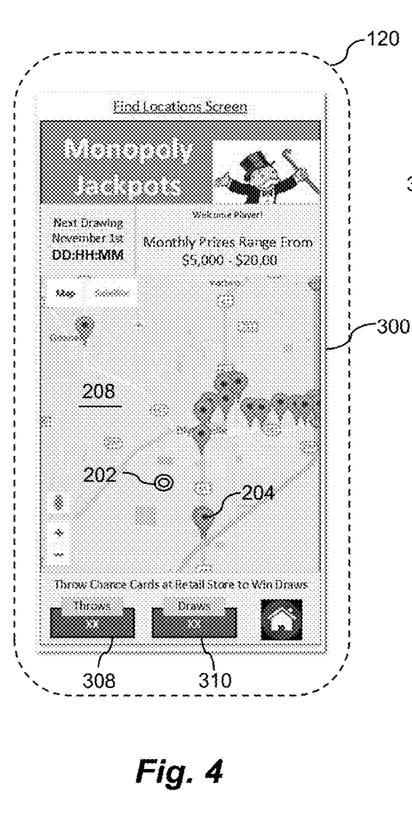
FIG. 4 depicts an exemplary screen of player's mobile device for locating real world geographic locations enabled for play of the augmented reality lottery game.
Figure 5:
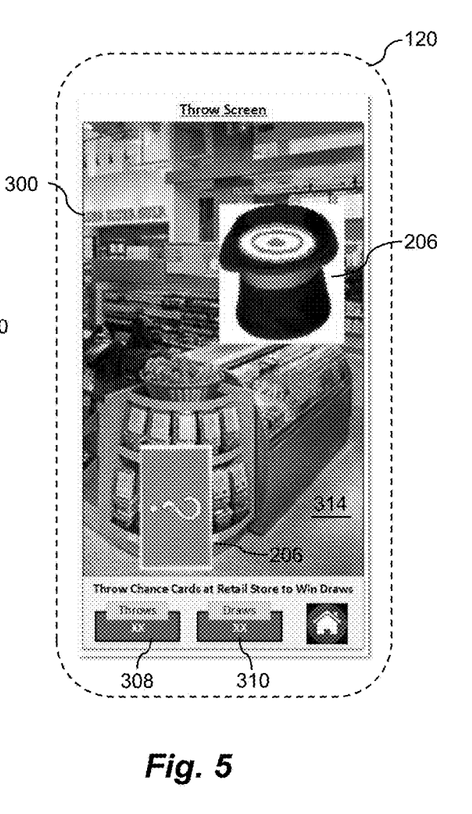
FIG. 5 depicts an exemplary screen of player's mobile device for playing the augmented reality game at a selected location.

FIGS. 3 through 5 depict play of an embodiment of an AR lottery game in accordance with aspects of the invention discussed above. Players can purchase lottery tickets 306 embodying the game at authorized retail locations. These tickets may be "instant" or "scratch-off" tickets having a primary game with a predetermined outcome revealed to the player upon removing a scratch-off coating from game indicia in a game play area of the ticket, as is well-known in the art. In the depicted embodiment, the ticket 306 includes a secondary or "second chance" game component wherein the ticket entitles the player to entry into a drawing for a prize. It is this second chance game that embodies the AR game. Various types of second chance games are well-known in the industry, and it should be appreciated that the specific game type, rules, or potential prizes are not limiting factors of the invention.

In the second chance AR game depicted in FIGS. 3 through 5, the AR game has an overall Monopoly™ game theme wherein the player interacts with Monopoly™ virtual elements in order to be entered into a periodic drawing for a cash prize. In particular, the player is guided to locations 204 in the real world where the player will encounter a virtual element 206 in the form of a Monopoly™ hat placed in the real world setting. Upon initiating the game, the player is granted a defined number of virtual Monopoly™ "chance" cards, for example a random number of between two and five cards. The virtual cards and hat will be enabled at the locations 204. Once enabled, the object of the game is for the player to "throw" the chance cards into the Monopoly™ hat, for example by a swiping action on the screen 300 or actuation of a throw button enabled on the screen 300. In one embodiment, the outcome of the throws is predetermined and not affected by how the game simulates throwing of the cards. In another embodiment, the outcome of the throws is not predetermined and is dependent of some level of skill or luck on the part of the player in the throwing technique. For each card that is thrown into the hat, the player is awarded an entry into the upcoming drawing. A meter or display 308 indicates how many chance cards are left to be thrown, and a separate meter or display 310 indicates the number of draws the player was won.

Referring to FIG. 3, the player is instructed to scan a code (e.g., a QR code) from the ticket 306 (pictured in the display screen 300 of the player mobile device 120) to enter the ticket into the second chance AR game. Alternatively, the player may manually enter the ticket's unique identification number. FIG. 3 depicts scanning of the code.

Once the ticket code has been scanned and verified, the game module 125 running on the player's device 120 initiates the game and provides the player with a prompt 302 to find the real world locations 204 where the virtual elements 206 are located.

FIG. 4 depicts the location screen presented to the player via the device screen 300. This screen may be any suitable representation of the geographic region 208 within a defined proximity to the player's current position 202. For example, a street map image or satellite view image may be provided to the player. The locations 204 where the player can interact with virtual elements 206 are "pinned" or otherwise identified on the map image. At this point, the player can choose to travel to any one or more of the locations 204. As discussed above, the type of location 204 can vary, and in one embodiment one or more of the locations 204 may be retail establishments that sell the lottery tickets or otherwise are involved in a commercial activity related to the lottery.

Referring to FIG. 5, once the player has moved to within a defined proximity to one of the locations 204, another prompt 304 on the screen 300 is enabled that allows the player to see and interact with one or more virtual elements 206. In this particular embodiment, upon actuation, the prompt 304 switches the player mobile device 120 to "augmented reality" mode wherein the screen 300 displays a view of the player's surrounding environment as captured by the device's camera. For example, the player may be in a retail location (e.g., a convenience store) wherein the screen 300 depicts the image 314 captured by the device's camera in the store. The virtual elements 206 (the Monopoly™ hat and cards) are overlaid on the image by the device game module 125. At this time, the player takes action via the screen 300 to "throw" one or more of the cards into the hat, as discussed above.

The AR aspects of the game may be structured such that if the player changes position or location in the location 204 (as detected by the device's location device 128 or gyroscope feature), the virtual elements 206 may be disabled or disappear from the screen 300. This gives the illusion that the virtual elements 206 are located at a fixed position/location within the store 204.

In certain embodiments, the player is not required to throw any defined number of the cards at any given location 204. For example, then player may have five cards available to throw, and may elect to throw one card at five different locations, and so forth.

The player may be able to accumulate cards (throws) from multiple lottery tickets, wherein the "Throws" meter 308 reflects the total number of cards available to the player at any given time. The cards may expire at the time of the drawing, or may carry over to the next drawing period.

In certain embodiments, cards that are thrown and miss the hat are removed from the player's cache of cards. In other embodiments, the miss cards may be revitalized. For example, after a miss, the game may inform the player that the card can be thrown again after a predefined time period.

It should be appreciated that the interaction between the player and the virtual elements 206 discussed above with respect to the Monopoly™ game is for discussion purposes only. For example, other AR games may require the player to capture or collect virtual elements, to battle virtual elements against each other, to find hidden virtual elements, and so forth. The present invention is not limited to any particular interaction between the player and virtual elements.

It should also be appreciated that the AR game component may be used as the primary game embodiment by the lottery ticket. For example, in order for the player to learn the predetermined outcome of their instant lottery ticket, they may be directed through an AR interaction with virtual game elements that reveal the outcome of the game. For example, the covered game indicia typically presented on a conventional scratch-off lottery ticket may be populated into the player's real world environment as virtual game indicia at a defined location, and the player presented with a virtual tool that is used to scrape away the virtual scratch-off coating from the virtual game indicia to reveal the game outcome.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for implementing an augmented reality lottery game on a mobile device of a player, wherein a plurality of players can simultaneously play the augmented; reality lottery game, comprising:
   providing lottery tickets with a code for entry into the augmented reality lottery game;
   configuring a common game server for communication with the mobile device, wherein the player enters the code and transmits the code via the mobile device to the common game server to initiate the augmented reality lottery game;
   the common game server receiving real-world location data from the mobile device and transmitting locations of participating establishments to the mobile device within a predefined distance of a location of the player;
   upon verifying the location: of the player at one of the participating establishments, the common game server enabling an overlay of one or more virtual objects on a screen image on the mobile device of the player of an establishment location; and
   the mobile device providing instructions to the player for interacting with the one or more virtual objects in accordance with objects of the augmented reality lottery game.

2. The method for implementing the augmented reality lottery game in accordance with claim 1, wherein the player requests the locations of the participating establishments from the common game server via a prompt provided on the mobile device of the player.

3. The method for implementing the augmented reality lottery game in accordance with claim 1, wherein the locations of the participating establishments are presented in a map provided by the mobile device, the location of the player also displayed on the map.

4. The method for implementing the augmented reality lottery game in accordance with claim 1, wherein the common game server maintains a database of the participating establishments for continuously or periodically updating the participating establishments within the predefined distance of the location of the player.

5. The method for implementing the augmented reality lottery game in accordance with claim 1, wherein the participating establishments are commercial establishments authorized for sale of the lottery tickets.

6. The method for implementing the augmented reality lottery game in accordance with claim 1, wherein the augmented reality lottery game is a first lottery game associated with the lottery tickets.

7. The method for implementing the augmented reality lottery game in accordance with claim 6, wherein the first lottery game is an instant scratch-off game, wherein the player interacts with the one or more virtual objects to reveal hidden game indicia that displays an outcome of the instant scratch-off game.

8. The method for implementing the augmented reality lottery game in accordance with claim 7, wherein the one or more virtual objects are presented as scratch-off pads at the participating establishments and the player interacts with the one or more virtual objects by simulating scratching off of a coating from the scratch-off pads with a virtual scratch off tool to reveal the hidden game indicia.

9. The method for implementing the augmented reality lottery game in accordance with claim 1, wherein the augmented reality lottery game is a second one of two lottery games associated with the lottery tickets.

10. The method for implementing the augmented reality lottery game in accordance with claim 1, wherein the one or more virtual objects displayed on the screen image are disabled or disappear from the screen image when the player moves from their position within the participating establishment.

11. The method for implementing the augmented reality lottery game in accordance with claim 1, wherein the augmented reality lottery game has a theme of a board game and, the one or more virtual objects are associated with game pieces used in the board game.

12. The method for implementing the augmented reality lottery game in accordance with claim 11, wherein the player interacts with the one or more virtual objects by simulating an action via the mobile device to capture or acquire the one or more virtual objects.

13. The method for implementing the augmented reality lottery game in accordance with claim 11, wherein the player interacts with the one or more virtual objects by simulating throwing an object into the one or more virtual objects via the mobile device.

\* \* \* \* \*